United States Patent [19]

Shimizu et al.

[11] Patent Number: 5,176,958
[45] Date of Patent: Jan. 5, 1993

[54] MODIFIED POLYTETRAFLUOROETHYLENE FINE POWDER AND PROCESS FOR PREPARING THE SAME

[75] Inventors: Tetsuo Shimizu, Ibaraki; Kazutaka Hosokawa, Settsu; Masuo Kokumai, Itami; Makoto Ono, Osaka, all of Japan

[73] Assignee: Daikin Industries Ltd., Osaka, Japan

[21] Appl. No.: 715,029

[22] Filed: Jun. 13, 1991

Related U.S. Application Data

[63] Continuation of Ser. No. 566,865, Aug. 13, 1990, abandoned, which is a continuation of Ser. No. 445,937, Dec. 7, 1989, abandoned, which is a continuation of Ser. No. 210,348, Jun. 23, 1988, abandoned.

[30] Foreign Application Priority Data

Jun. 24, 1987 [JP] Japan ................................. 62-156875

[51] Int. Cl.⁵ ........................ B32B 5/16; C08F 116/12
[52] U.S. Cl. ...................................... 428/402; 526/247
[58] Field of Search ........................ 526/247; 428/402

[56] References Cited

U.S. PATENT DOCUMENTS

| | | | |
|---|---|---|---|
| 3,142,665 | 7/1964 | Cardinal et al. | 526/84 |
| 3,819,594 | 6/1974 | Holmes et al. | 526/247 |
| 4,159,370 | 6/1979 | Koizumi et al. | 526/73 |
| 4,363,900 | 12/1982 | Shimizu et al. | 526/84 |
| 4,530,981 | 7/1985 | Malhotra . | |
| 4,552,925 | 11/1985 | Nakagawa et al. | 526/247 |
| 4,694,045 | 9/1987 | Moore | 526/247 |

FOREIGN PATENT DOCUMENTS 0224037 6/1987 European Pat. Off. ............ 526/247

2750566 5/1978 Fed. Rep. of Germany .

OTHER PUBLICATIONS

Official Gazette 1046 TMOG-2 Sep. 4, 1984.

*Primary Examiner*—Joseph L. Schofer
*Assistant Examiner*—N. Sarofim
*Attorney, Agent, or Firm*—Birch, Stewart, Kolasch & Birch

[57] ABSTRACT

Modified PTFE fine powder which comprises colloidal particles of a copolymer comprising repeating units derived from tetrafluoroethylene and 0.02 to 0.3% by weight, preferably 0.03 to 0.2% by weight of repeating units derived from at least one fluoroalkyl vinyl ether selected from compounds of the formula:

$$X(CF_2)_nOCF=CF_2 \qquad (I)$$

wherein X is a hydrogen, fluorine or chlorine atom and n is an integer of 1 to 6, and $$C_3F_7(OCF_2CF_2CF_2)_m[OCF(CF_3)CF_2]_lOCF=CF_2 \qquad (II)$$

wherein m and l are each an integer of 0 to 4 provided that at least one of them is not zero, which has a number average particle size of 0.05 to 0.6 μm, wherein the copolymer has a specific melt viscosity of from $6 \times 10^{10}$ to $30 \times 10^{10}$ poise, preferably from $8.0 \times 10^{10}$ to $25 \times 10^{10}$ poise at 380° C. and a standard specific gravity (SSG, hereinafter defined) of from 2.135 to 2.175, preferably from 2.140 to 2.160 and a paste extruded article of the polymer has a green elongation of at least 400% is provided.

6 Claims, No Drawings

MODIFIED POLYTETRAFLUOROETHYLENE FINE POWDER AND PROCESS FOR PREPARING THE SAME

This application is a continuation 07/566,865 filed on Aug. 13, 1990, which is a continuation of application Ser. No. 07/445,937 filed on Dec. 7, 1989, which is a continuation of application Ser. No. 07/210,348 filed on Jun. 23, 1988, all now abandoned.

BACKGROUND OF THE INVENTION

1. Field of the Invention

The present invention relates to modified polytetrafluoroethylene (hereinafter referred to as "PTFE") fine powder and a process for preparing the same. More particularly, it relates to modified PTFE fine powder which has improved paste extrudability, rollability and drawability and affords a molded article having good sintering properties, dimensional stability during sintering, adhesivity, transparency, mechanical properties and the like.

2. Description of the Related Art

PTFE fine powder is used in the form of a molded article which is produced by paste extruding PTFE fine powder together with a liquid lubricant and optionally rolling the article to form an unsintered sheet which can be used as a sealing material. Alternatively, the molded article of the PTFE fine powder such as a sheet, a pipe and a rod is sintered before use.

When the unsintered paste extruded article of the PTFE fine powder or a rolled sheet is drawn, its porosity is decreased to give a porous material without substantially decreasing its cross section. Such drawn porous material is used as a sealing material in the unsintered state or as a continuous PTFE porous tough sheet in the sintered state.

Since the PTFE fine powder is processed by a specific method and used in special fields, the PTFE fine powder is required to have high productivity and rolling and drawing processability and further improved dimensional stability during sintering and good mechanical properties and transparency of the molded article after sintering. It is known that such required properties depend on the properties of the PTFE fine powder to be used as a raw material. However, the required properties include wide variety of properties from versatile molding properties to the properties of the final product. In the conventional PTFE fine powder, some of these properties are sacrificed to improve some other properties. For example, some PTFE fine powder is excellent in molding properties but poor in mechanical properties are. Insofar as the molding properties concerned, some PTFE fine powder has good paste extrudability but inferior drawability.

It is proposed to modify PTFE while maintaining its inherent non-melt processability by copolymerizing about 1% by mole or less of a fluorine-containing monomer with tetrafluoroethylene (TFE) (cf. U.S. Pat. Nos. 3,142,665 and 3,819,594 and Japanese Patent Publication Nos. 4643/1962, 38159/1975 and 26242/1981). The proposed copolymers are called as "modified PTFE" and are distinguished from melt processable TFE copolymers. By "modification", extrudability at a high reduction ratio (HRR) (Note: Reduction ratio=a ratio of a cross section of an extrusion die outlet to that of a cylinder portion of an extruder in which resin paste is charged), sintering properties particularly a sintering rate and transparency of the sintered article are more or less improved, although rollability (easiness of producing a thin and wide sheet by rolling the paste extruded article) and drawability are deteriorated.

It was known to increase a molecular weight of a homopolymer of TFE so as to impart a special DSC melt property to PTFE and thereby providing PTFE which have good drawability (cf. Japanese Patent Publication Nos. 54016/1981 and 39443/1983). However, the high molecular weight PTFE has inferior paste extrudability at HRR and thus poor productivity. Further, it affords a molded article having poor sintering property, and the sintered article has less self-fusion bonding or transparency.

SUMMARY OF THE INVENTION

One object of the present invention is to provide modified PTFE fine powder which not only has improved paste extrudability but also good dimensional stability during sintering and can provide a sintered molded article having good mechanical and transparency properties, and a process for preparing such PTFE fine powder.

Another object of the present invention is to provide modified PTFE fine powder which provides a paste extruded article, particularly a tube having improved dimensional stability during sintering and good mechanical properties and transparency after sintering.

A further object of the present invention is to provide PTFE fine powder which provides a drawn molded article having good sintering property and adhesivity.

These and other objects are accomplished by modified PTFE fine powder of the present invention, which comprises colloidal particles of a copolymer comprising repeating units derived from tetrafluoroethylene and 0.02 to 0.3% by weight, preferably 0.03 to 0.2% by weight of repeating units derived from at least one fluoroalkyl vinyl ether selected from the group consisting of compounds of the formula:

$$X(CF_2)_nOCF=CF_2 \qquad (I)$$

wherein X is a hydrogen, fluorine or chlorine atom and n is an integer of 1 to 6, and

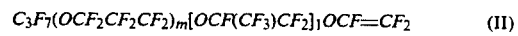
$$C_3F_7(OCF_2CF_2CF_2)_m[OCF(CF_3)CF_2]_lOCF=CF_2 \qquad (II)$$

wherein m and l are each an integer of 0 to 4 provided that at least one of the integers is not zero, which has a number average particle size of 0.05 to 0.6 μm, wherein the copolymer has a specific melt viscosity of from $6 \times 10^{10}$ to $30 \times 10^{10}$ poise, preferably from $8.0 \times 10^{10}$ to $25 \times 10^{10}$ poise at 380° C. and a standard specific gravity (SSG, hereinafter defined) of from 2.135 to 2.175, preferably from 2.140 to 2.170, more preferably from 2.140 to 2.160 and a paste extruded article of the polymer has a green elongation of at least 400%.

DETAILED DESCRIPTION OF THE INVENTION

In the modified PTFE fine powder of the present invention, fluoroalkyl vinyl ether (I) and/or (II) should be used as a modifier. By the sole use of a conventional modifier such as hexafluoropropene and chlorotrifluoroethylene, the objects of the present invention cannot be accomplished.

When the content of the modifier in the modified PTFE is too small, the sintered article has less adhesivity or poor transparency. When it is too large, the molded article is too soft.

Preferred examples of the modifier are $C_3F_6O-CF=CF_2$, $C_4F_9OCF=CF_2$, $ClC_3F_6OCF=CF_2$, $C_3F_7[OCF(CF_3)CF_2-]_lO-CF=CF_2$ wherein l is 1 or 2, etc.

When the specific melt viscosity of the modified PTFE is too low, the rollability or the drawability of the paste extruded material is deteriorated and further the molded article, particularly a pipe or tube having a large diameter is largely deformed due to melt flowing during sintering after extrusion molding. That is, the dimension stability of the molded article is deteriorated. When the specific melt viscosity is too high, extrudability of the modified PTFE at HRR may be adversely influenced.

One of the characteristics of the modified PTFE fine powder of the present invention resides in a higher specific melt viscosity than the conventional modified PTFE fine powder and the small SSG. These parameters relate to the rollability and drawability of the polymer and further the mechanical properties of the sintered article. Therefore, these parameters are important to improve such properties of the PTFE fine powder and the sintered article. The PTFE fine powder having a lower specific melt viscosity or a smaller SSG has poor rollability or drawability. When the polymer has SSG larger than 2.175, it has insufficient mechanical properties such as flexing resistance.

Since the modified PTFE of the present invention has the specific melt viscosity of $6 \times 10^{10}$ poise or larger, SSG of 2.175 or less and green elongation (elongation of an unsintered molded article formed by paste extrusion of the PTFE fine powder and removing the lubrication aid from the molded article) of 400% or larger, the molded article of the PTFE fine powder of the present invention is so tough that its flexing life exceeds 6,000,000 times.

The green elongation may be used as a criterion for rollability or drawability of the paste molded article. When the green elongation is less than 400%, a sheet having a large width cannot be produced by rolling or a thickness of the sheet cannot be made thin. Further, during rolling, pores tends to become uneven or the sheet tends to break. Since the PTFE fine powder of the present invention has large green elongation, it has good rollability and drawability.

The modified PTFE of the present invention is assumed to have inherently a particularly large molecular weight. The good mechanical properties such as flexing resistance of the molded article may be due to such high molecular weight of the PTFE.

Above described, U.S. Pat. No. 3,142,665 (hereinafter referred to as "'665 patent") and U.S. Pat. No. 3,819,594 (hereinafter referred to as "'594 patent") use a fluoroalkyl vinyl ether of the formula:

$C_3F_7OCF=CF_2$ (hereinafter referred to as "PPVE") as a modifier of PTFE.

While the PTFE fine powder of Examples 27 and 28 of '665 patent had SSG and specific melt viscosity of 2.223 $6.2 \times 10^{10}$ poise and of 2.184 and $4.8 \times 10^{10}$ poise, respectively and the content of PPVE was 0.114% by weight in Example 28, '594 patent describes that a process for preparing a fluoroalkyl vinyl ether-modified PTFE having a low SSG and specific melt viscosity, and that the prepared modified PTFE has good mechanical properties. In addition, '594 patent stated that, by the use of disuccinic acid peroxide used in '655 patent as a polymerization initiator, a fluorovinyl ether-modified PTFE having a low SSG and low specific melt viscosity is not prepared but a persulfate can produce a modified PTFE having a low SSG and specific melt viscosity.

On the contrary, the present invention provides a modified PTFE having a low SSG and a high specific melt viscosity which can be prepared by a process of the present invention.

The modified PTFE of the present invention may be prepared by a process comprising copolymerizing TFE and at least one of fluoroalkyl vinyl ether (I) or (II) in an aqueous medium containing 0.03 to 0.3% by weight of a water-soluble fluorine-containing dispersant under a reaction pressure of from 6 to 40 kg/cm$^2$G at a temperature of from 10 to 95° C. in the presence of a polymerization initiator wherein, after the copolymerization is initiated and at least 10% by weight, preferably at least 30% by weight of the finally produced copolymer is copolymerized and prior to at most 85% by weight, preferably at most 70% by weight of the finally produced copolymer is copolymerized, (a) a radical scavenger is added in an amount of 0.2 to 5 times mole of the polymerization initiator or (b) the polymerization temperature is lowered by 10° to 40° C.

Except for the addition of radical scavenger or the temperature decrease, the polymerization conditions in the present process are substantially the same as in the conventional process for preparing PTFE fine powder. The polymerization is preferably carried out in an aqueous medium with stirring in the presence of a polymerization initiator.

The radical scavenger to be added to the polymerization system may be any radical scavenger which is capable of terminating polymerization, is soluble in water to some extent and hardly allows polymerization to be re-initiated having been added or to allow chain transferred selectively to a low molecular weight radial rather than to a surface of a polymer latex particle in the reaction system. For example, aromatic hydroxy compounds, aromatic amine compounds and quinones which have solubility in water of at least $2.5 \times 10^{-6}$ mole/l at 25° C. are useful. Preferred examples of such compounds are hydroquinone, catechol, pyrogallol, p-phenylenediamine, p-benzoquinone, N,N-diethylhydroxyamine and the like.

Examples of the polymerization initiator are persulfates (e.g. ammonium persulfate, potassium persulfate, etc.), water soluble organic peroxides (e.g. disuccinic acid peroxide, diglutaric acid peroxide, etc.) and mixtures thereof. The persulfate is used in a concentration of from 2 to 300 ppm, preferably from 2 to 200 ppm in an aqueous medium. Disuccinic acid peroxide is used in a concentration of from 20 to 1,000 ppm, preferably from 40 to 330 ppm in an aqueous medium. When a combination of disuccinic acid peroxide and the persulfate is used, paste extrudability of the PTFE fine powder is improved In this case, disuccinic acid peroxide and the persulfate are preferably used in a weight ratio of from 50:1 to 8:1. Two types of the polymerization initiators may be simultaneously added to the reaction system, although they may be added separately at different stages. When the polymerization temperature is low, a redox system comprising the persulfate and a reducing agent (e.g. sodium sulfite and sodium hydrogensulfite) may be used.

Specific examples of the water soluble fluorine-containing dispersant are compounds of the formulae:

$$X(CF_2)_aCOOH \qquad (III)$$

wherein X is a hydrogen, fluorine or chlorine atom and a is an integer of 6 to 12, $$Cl(CF_2CFCl)_bCF_2COOH \qquad (IV)$$

wherein b is an integer of 2 to 6, $$(CF_3)_2CF(CF_2CF_2)_cCOOH \qquad (V)$$

wherein c is an integer of 2 to 6, and $$F(CF_2)_dO[CF(Y)CF_2O]_eCF(Y)COOH \qquad (VI)$$

wherein Y is a fluorine atom or a trifluoromethyl group and d is an integer of 1 to 5, and their ammonium salts or alkali metal salts (e.g. potassium salts and sodium salts). Particularly, a compound of the formula:

$$C_nF_{2n+1}COOM \text{ or}$$
$$C_3F_7[CF(CF_3)CF_2O]_pCF(CF_3)COOM$$

wherein n is an integer of 6 to 9, p 1 or 2 and M is an ammonium group or an alkali metal.

Although the total amount of the dispersant may be added to the reaction system at one time, it can also be added according to a programmed addition method disclosed in Japanese Patent Publication No. 14466/1969 or U.S. Pat. No. 3,391,099, the disclosure of which is hereby incorporated by reference. An amount of the dispersant is from 0.03 to 0.3% by weight, preferably from 0.05 to 0.2% by weight based on the weight of the aqueous medium.

The required amount of the modifier fluoroalkyl vinyl ether (I) or (II) is most preferably added to the reaction system all at once when the polymerization is initiated.

The reaction system may contain a dispersion stabilizer which is substantially inactive to the polymerization reaction, for example a hydrocarbon having at least 12 carbon atoms which is in a liquid state under the reaction conditions.

To adjust pH of the reaction system, a buffer such as ammonium carbonate and ammonium phosphate may be used.

The polymerization temperature may be in a range of from 10° to 95° C. When the persulfate or the water soluble organic peroxide is used as the polymerization initiator, the polymerization temperature is preferably from 60° to 90° C. When the redox system such as a combination of the persulfate and sodium sulfite or of disuccinic acid peroxide and reducing iron is used, a lower polymerization temperature can be selected.

Instead of the addition of the radical scavenger, the reaction condition can be changed by lowering the reaction temperature during the course of the polymerization. The reaction temperature is lowered by 10° to 40° C. from the normal reaction temperature. It is possible to lower the reaction temperature in addition to the use of the radical scavenger. In this case, a degree of the temperature lowering can be decreased.

Because of the change in the reaction condition(s), a polymerization time in the process of the present invention is at least 1.3 times, usually at least 2 times longer than the conventional process in which no reaction condition is changed. This is because the increase of the total number of radical is suppressed during the reaction. By the process of the present invention, the modified PTFE having a larger molecular weight is produced.

The amount of the radical scavenger is not less than 20% by mole and not larger than 500% by mole, preferably from 50 to 300% by mole based on the amount of the used polymerization initiator. When the too much radical scavenger is added, not only is the productivity of the modified PTFE deteriorated but also the molded article is colored.

In the case where disuccinic acid peroxide is used as the polymerization initiator, it is preferred to change the reaction condition by lowering the reaction temperature rather than by the addition of the radical scavenger, since some types of radical scavengers will increase the total number of radicals in the reaction system by a redox reaction with disuccinic acid peroxide.

The polymerization reaction is carried out under a pressure of 6 to 40 kg/cm²G which is generated by TFE. When the persulfate is used as the polymerization initiator, the reaction pressure is preferably from 6 to 17 kg/cm²G. If the reaction pressure is high, the polymerization is completed before the effect of the reaction condition change is achieved. Although the reaction pressure is kept constant, it is possible to change the pressure of TFE to control the particle size of the produced polymer, as disclosed in Japanese Patent Kokai Publication No. 76516/1985. The preferred reaction conditions in the process of the present invention are as follows:

(1) As the polymerization initiator, 2 to 30 ppm of ammonium persulfate or alkali metal persulfate is used, and the reaction pressure is kept in a range of from 6 to 17 kg/cm²G, (2) As the polymerization initiator, 20 to 1,000 ppm of disuccinic acid peroxide and a 1/50 to 1/50 time amount of ammonium persulfate are used in combination, and the reaction condition is changed by lowering the reaction temperature.

(3) As the water soluble fluorine-containing dispersant, $C_nF_{2n+1}COOM$ or $C_3F_7O[CF(CF_3)CF_2O]_pCF(CF_3)COOM$ wherein n, p and M are the same as defined above is used in a concentration of 0.05 to 0.2% by weight, as the polymerization initiator, ammonium persulfate or alkali metal persulfate is used in a concentration of 5 to 20 ppm, and the reaction temperature is kept in a range from about 60° to 90° C., (4) As the polymerization initiator, disuccinic acid peroxide in a concentration of 40 to 300 ppm and 1/50 to ⅛ time of the disuccinic acid peroxide of ammonium persulfate in a concentration of 3 to 10 ppm are used in combination.

When the polymer concentration in the medium reaches 20 to 45% by weight, the polymerization reaction is terminated by discharging the unreacted monomers and by terminating the stirring. Thereafter, a aqueous dispersion of the polymer (hereinafter referred to as "polymer latex" or simply "latex") is recovered from a reactor and then subjected to subsequent treatments, namely coagulation and drying.

The coagulation of the polymer particles is carried out by diluting the polymer latex with water to a polymer concentration of 10 to 20% by weight, optionally adjusting the pH of the diluted latex to neutral or alkaline and stirring the latex in a vessel equipped with a stirrer more vigorously than in the polymerization step.
In the coagulation, a coagulant such as a water soluble organic compound (e.g. methanol, acetone, etc.), an inorganic salt (e.g. potassium nitrate, ammonium carbonate, etc.) and an inorganic acid (e.g. hydrochloric acid, sulfuric acid, nitric acid, etc.) may be added while stirring.

The addition of a pigment for coloring the polymer or a filler for improving the mechanical properties of the polymer latex before or during coagulation serves to provide a PTFE fine powder containing such additive which is homogeneously mixed therewith.

When the stirring is adequately carried out, after separation of the polymer particles from the polymer latex, granulation and adjustment of particle size are simultaneously completed, and a handling property of the PTFE fine powder after coagulation is improved.

The wet powder of the modified PTFE which is obtained by coagulation is dried by the application of evacuation, high frequency or hot air which renders the powder to be less flowable, particularly standing still. Contact or friction between the powder particles particularly at a high temperature has adverse influence on emulsion polymerized PTFE, since this type of PTFE is easily fibrillated by a small shear force so that its loses a crystalline structure which is formed by the polymerization. The drying temperature is generally from 10° to 250° C., preferably from 100° to 200° C. The drying temperature has a great influence on paste extrusion conditions. For example, as the drying temperature increases, the paste extrusion pressure increases. Therefore, in order to compare the paste extrudability of two types of PTFE fine powder, they should be dried at substantially the same temperature.

The modified PTFE of the present invention may be used in the form of a latex, although it is used in the form of fine powder. For example, the polymer latex which is obtained by the polymerization reaction is stabilized by a nonionic surfactant, concentrated and optionally mixed with an organic or inorganic filler to prepare a coating composition. The coating composition is applied on a surface of a metallic or ceramic substrate and dried to give a coating layer having good gloss, evenness and/or abrasion resistance. The coating composition comprising the modified PTFE fine powder of the present invention is suitable for coating a roller and a cooking utensil or dip coating a glass fiber cloth.

The polymer latex and the PTFE fine powder are analyzed and tested as follows:

Polymer concentration

The polymer latex (10 g) is poured on a glass dish and left in a furnace kept at 150° C. for about 3 hours to evaporate to dryness. Then, the residual solid is weighed and a polymer concentration is calculated.

Number average particle size

From transmittance of incident light having a wavelength of 550 nm through a unit length of a polymer latex which is adjusted to a solid content of 0.22% by weight, a number average particle size is determined based on a calibration curve which is generated from said transmittance and a number average particle size based on length measured along a specific direction by a transmission type electron microscope.

Standard specific gravity (SSG)

SSG is a ratio of a weight in the air of a PTFE sample prepared by the standard method to a weight of water of the same volume as the PTFE sample (at 23° C). The standard sample of PTFE is prepared by placing 12 g of dried PTFE powder between a pair of aluminum foils held in a cylindrical metal mold having a diameter of 2.86 cm, gradually pressing the polymer over about 30 seconds to final pressure of about 352 kg/cm$^2$G and keeping said pressure for 2 minutes. The obtained pre-molded article is placed in an air oven kept at 290° C., heated from 290° C. to 380° C. at a heating rate of 2° C./min., kept at 380° C. for 30 minutes, cooled to 294° C. at a cooling rate of 1° C./min., removed from the oven and then kept standing at 23° C. for 3 hours.

Generally, SSG is deemed to be an indirect expression of a number average molecular weight of a TFE base polymer. The smaller is SSG, the larger is the molecular weight. However, it may not be correct in principle to estimate the molecular weight of the modified PTFE.

Paste extrusion test (1) RR=100

The PTFE fine powder (50 g) and a hydrocarbon oil (10.8 g) as an extrusion aid ("IP 1620", a trade name of Idemitsu Petrochemical) are mixed in a glass bottle and aged at room temperature (25°±2° C.) for one hour. Then, the aged mixture is charged in an extrusion die which has a reduction angle of 30° and, at its downstream end, an orifice with an inner diameter of 2.54 mm and a land length of 7 mm and is equipped with a cylinder with an inner diameter of 25.4 mm and kept with applying a load of 60 kg to a piston inserted in the cylinder for one minute.

Immediately thereafter, the mixture is extruded at a ram speed (a pushing speed of the piston) of 20 mm/min. to form a rod-shaped article. Extrusion pressure (kg/cm$^2$G) is calculated by dividing a pressure when the pressure is equilibrated in the latter part of extrusion by a cross sectional area of the piston.

(2) RR=710

In the same manner as in the case of RR=100 but using an extrusion die having a reduction angle of 30°, an orifice diameter of 0.95 mm and a land length of 2.0 mm, the extrusion pressure is measured. In this test, not only the extrusion pressure is measured, but also appearance of the extruded article is observed and evaluated according to the following criteria:

A: The extruded article does not meander and has a smooth surface

B: The extruded article slightly meanders but has a smooth surface

C: The extruded article meanders and has a few protrusions on its surface (These defects can be removed by adjusting the extrusion rate and an amount of the extrusion aid.)

D: The extruded article greatly meanders and has many protrusions, or is broken during extrusion (having no practical value)

Elongation of unsintered bead (green elongation)

The rod-shaped extruded article obtained by extrusion at RR of 100 is dried at about 100° C. for about 10 hours and five sample pieces each having a length of about 7 cm are cut our from a latter part of the rod which is extruded under the stable extrusion pressure. Both ends of each piece of about 15 mm are sintered in a salt bath kept at 380° C. and a pair of lines 20 mm apart from each other in a longitudinal direction are marked on the peripheral surface. Then, the both ends are held by a pair of cramps of a tensile machine and pulled at a rate of 200 mm/min. The distance between the lines (EL) is measured and elongation (%) is calculated according to the following equation:

$$\text{Elongation (\%)} = \frac{EL \text{ (mm)} - 20 \text{ mm}}{20 \text{ mm}} \times 100$$

The number of test runs is five. Three elongation values excepting the maximum and minimum values are averaged.

During the tensile test, the room temperature is adjusted at 24°±0.5° C.

Specific melt viscosity

By means of "Thermoflex TMA" (a sample at a lower position type) (manufactured by Rigaku Denki Co., Ltd.), a creep test is carried out to measure the specific melt viscosity according to the following procedures:

A test piece is prepared by placing 80 g of PTFE fine powder between a pair of paper sheet held in a cylindrical metal mold having a diameter of 50 mm, gradually pressing the polymer over about 30 seconds to final pressure of about 352 kg/cm$^2$G and keeping said pressure for 2 minutes. The molded article is sintered in an air electric furnace at 371° C. for 90 minutes, cooled to 250° C. at a cooling rate of 1° C./min. and kept at 250° C. for 30 minutes. Then, the sintered article is removed from the furnace and peeled around the peripheral surface to prepare a ribbon-shaped sheet having a thickness of 0.5 mm.

From the sheet, a small test piece of 4 to 5 mm in width and 15 mm in length is cut out. The width and the thickness are precisely measured to calculate a cross sectional area. At both ends of the test piece, a pair of a sample cramping tools are attached with a distance between the tools of 1.0 cm. Then, an assembly of the test piece and the cramping tools is installed in a cylindrical furnace and heated from room temperature to 380° C. at a heating rate of 20° C./min. and kept at that temperature for about 5 minutes. Thereafter, a load of about 15 g is applied to the test piece. From a curve of elongation change with time, elongation between 60 minutes and 120 minutes after the application of the load is read, and elongation per hour (60 minutes) is determined. The specific melt viscosity is calculated according to the following equation:

$$\eta = \frac{W \times Lr \times g}{3 \times (dLr/dT) \times Ar}$$

wherein
$\eta$ = a specific melt viscosity (poise)
W = a tensile load (grams)
Lr = a length of the test piece
g = the gravitational constant, 980 cm/sec.$^2$
dLr/dT = elongation per hour between 60 minutes and 120 minutes (cm/min.)
Ar = a cross sectional area (at 380° C.) (cm$^2$).

From the result of thermal expansion, Lr/Ar is calculated according to the following equation:

$$Lr/Ar = 0.80 \times L/A$$

wherein
L = a length of the test piece at room temperature
A = a cross sectional area at room temperature.

Tensile test

A tensile machine equipped with an air circulation oven is used. A rod-shaped extruded article which is produced by extrusion at RR=100 is cut. Both ends of the cut sample are cramped with leaving an uncramped part of a length of L (mm) according to the tensile test conditions No. 1 to No. 4 shown in Table 1, and the sample is heated to T° C. and drawn by a draw ratio of K at a drawing rate of E (mm/min.).

TABLE 1

| Test Condition | L (mm) | E (mm/min.) | Drawing rate (%/sec.) | K (times) | T (°C.) |
|---|---|---|---|---|---|
| No. 1 | 50 | 3,000 | 100 | 6 | 300 |
| No. 2 | 28 | 500 | 30 | 4 | 200 |
| No. 3 | 33 | 100 | 5 | 4 | 200 |
| No. 4 | 17 | 50 | 5 | 10 | 200 |

Uniformity of drawing and smoothness of the appearance of the drawn rod are observed.

The uniformity of drawing is evaluated as follows:

An ink mark is made at a center point of the uncramped part of the rod before drawing and the deviation of the mark from the center point is measured. Then, the uniformity of drawing (%) is calculated according to the following equation:

$$\text{Uniformity of drawing} = \frac{\text{Shorter distance between the rod end and the mark}}{\text{A half of the whole length of the drawn rod}} \times 100$$

The appearance of the drawn rod is evaluated according to the following criteria:
A: Smooth
B: A little unevenness
C: Much unevenness
D: Broken during drawing Flex life (MIT flex life)

An MIT testing machine described in ASTM D2176-63 is used. The number of double flexing required for breaking a sample under tension of 1.2 kg is measured. The sample is prepared by cutting the sheet having a thickness of 0.50 mm which is prepared for measurement of the specific melt viscosity to a piece of 6.5 mm in width and 14 cm in length. Except Example 4, the flexing test is terminated at the flexing number of 6,000,000.

Adhesivity (Self-fusion bonding)

Six sample pieces each having a length of about 10 cm are cut from the sheet having a thickness of 0.50 mm which is prepared for measurement of the specific melt viscosity. Three pairs of the sample pieces are sandwiched between a pair of aluminum plates each having a thickness of 2 mm with overlapping an area of 4 cm$^2$ of two pieces in each pair. Then, the sample pieces sandwiched between the aluminum plate are placed in a heat press kept at 370° C. After 5 minutes, the pressure is increased to 70 kg/cm$^2$G. After 5 minutes pressing, the sample pieces are quenched with water and removed from the aluminum plates. Each piece is cut to a width of 10.0 mm and subjected to tensile test at a drawing rate of 50 mm/min. to measure adhesive strength (kg/cm).

The modified PTFE of the present invention has excellent self-fusion bonding strength. Except Comparative Example 2, all the bonded pieces were broken before peeling off.

Transparency

Transparency is determined qualitatively or quantitatively by observing the sheet having a thickness of 0.50 mm which is prepared for measurement of the specific melt viscosity. Except Comparative Example 2, all the sheet had good transparency.

Example 1

In a stainless steel (SUS 316) made one liter autoclave equipped with anchor type stirring blades made of stainless steel and a temperature regulating jacket, deionized water (540 ml), solid paraffin wax having a melting point of 56° C. (30 g) and ammonium perfluorooctanoate (0.55 g) were charged. At 70° C., the autoclave interior was replaced with nitrogen gas three times and TFE twice to purge oxygen. Then, the TFE gas was injected to pressurize to 25.5 kg/cm²G, and the mixture was stirred at 500 rpm at 70° C.

Then, perfluoropropyl vinyl ether (hereinafter referred to as "PPVE") (1.5 g) and a solution of ammonium persulfate (hereinafter referred to as "APS") (9.4 mg) in water (5 ml) were injected together with TFE to increase the internal pressure to 26 kg/cm²G. The reaction proceeded with acceleration while keeping the reaction temperature at 70° C. and the stirring rate at 500 rpm. TFE was injected continuously to maintain the internal pressure at 26±0.5 kg/cm²G.

When the amount of TFE consumed in the reaction reached 120 g, a solution of hydroquinone (4.7 g in water (7 ml) was injected together with TFE.

When the consumed amount of TFE reached 237 g, stirring and monomer supply were stopped, and the gas was purged to decrease the internal pressure to atmospheric pressure to terminate the reaction. When hydroquinone was added, 51% by weight of the polymer to be finally produced was produced [(120/237)×100%]. The whole reaction time was 4.4 hours and the average particle size was 0.19 μm.

A part of the resulting latex was evaporated to dryness to obtain the polymer as a residue. From the weight of the polymer, the polymer concentration in the latex was calculated to be 30.1% by weight.

After coagulation and washing of the latex, the polymer was dried at 140° C. for 16 hours. After drying, a PPVE content in the fine powder was measured to the 0.061% by weight.

The content of PPVE is calculated from absorbances at 995 cm$^{-1}$ and 2,360 cm$^{-1}$ in an IR spectrum chart of the polymer according to the following equation:

$$PPVE\ content\ (\%) = \frac{Absorbance\ at\ 995\ cm^{-1}}{Absorbance\ at\ 2,360\ cm^{-1}} \times 0.95$$

The polymer had SSG of 2.156 and specific melt viscosity of $1.2 \times 10^{11}$ poise.

When the polymer was paste extruded at RR of 100, the equilibrium extrusion pressure was 123 kg/cm², and the green elongation of the extruded rod was 1,100%.

At RR of 710, the extrusion pressure was 772 kg/cm², and the appearance of the extruded article was ranked as "B". As shown in Table 2, the drawing processability was extremely good in comparison to PTFE having small specific melt viscosity. In the adhesion test, the sheet itself was broken without peeling off. The sintered article had excellent transparency. The result of flex life test was over 6,000,000 times.

The results of Example 1 and following Examples and Comparative Examples are summarized in Table 2.

EXAMPLE 2

In the same autoclave as used in Example 1, deionized water (545 ml), an extra pure reagent grade liquid paraffin (30 g) and ammonium perfluorooctanoate (0.55 g) were charged. At 70° C., the autoclave interior was replaced with nitrogen gas three times and TFE twice to purge oxygen. Then, the TFE gas was injected to pressurize to 25.5 kg/cm²G, and the mixture was stirred at 500 rpm at 80° C.

Then, PPVE (1.4 g) and a solution of APS (9.9 mg) in water (5 ml) were injected together with TFE to increase the internal pressure to 26 kg/cm²G. The reaction proceeded with acceleration while keeping the reaction temperature at 70° C. and the stirring rate at 500 rpm. TFE was injected continuously to maintain the internal pressure at 26±0.5 kg/cm²G.

After the consumed amount of TFE reached 80 g, the temperature was decreased at a cooling rate of about 0.7° C./min. and after the consumed amount of TFE reached 103 g, the temperature was kept constant at 50° C.

When the consumed amount of TFE reached 271 g, stirring and monomer supply were stopped, and the gas was purged to decrease the internal pressure to atmospheric pressure to terminate the reaction.

The whole reaction time was 3.9 hours.

The resulting latex was post-treated in the same manner as in Example 1 to obtain PTFE fine powder.

EXAMPLE 3

In a stainless steel (SUS 316) made 6 liter autoclave equipped with anchor type stirring blades and a temperature regulating jacket, deionized water (2,960 ml), solid paraffin wax having a melting point of 56° C. (120 g) and ammonium perfluorooctanoate (3.0 g) were charged. At 70° C., the autoclave interior was replaced with nitrogen gas three times and TFE twice to purge oxygen. Then, the TFE gas was injected to pressurize to 7.0 kg/cm²G, and the mixture was stirred at 250 rpm at 70° C.

Then, PPVE (0.5 g) and a solution of APS (15 mg) in water (20 ml) were injected together with TFE to increase the internal pressure to 8.0 kg/cm²G. The reaction proceeded with acceleration while keeping the reaction temperature at 70° C. and the stirring rate at 250 rpm. TFE was injected continuously to maintain the internal pressure at 8.0 kg/cm²G.

When the amount of TFE consumed in the reaction reached 484 g, a solution of hydroquinone (7.5 g) in water (20 ml) was injected together with TFE.

When the consumed amount of TFE reached 1,102 g, stirring and monomer supply were stopped, and the gas was purged to decrease the internal pressure to atmospheric pressure to terminate the reaction. When hydroquinone was added, 44% by weight of the polymer to be finally produced was produced [(484/1,102)×100%]. The whole reaction time was 23.2 hours.

After coagulation and washing of the latex, the polymer was dried at 200° C. for 16 hours. A PPVE content in the fine powder was 0.03% by weight.

EXAMPLE 4

In the same autoclave as used in Example 3, deionized water (2,960 ml), an extra pure grade liquid paraffin (100 g) and ammonium perfluorooctanoate (3.0 g) were charged. At 70° C., the autoclave interior was replaced with nitrogen gas three times and TFE twice to purge oxygen. Then, the TFE gas was injected to pressurize to 7.0 kg/cm$^2$G, and the mixture was stirred at 250 rpm at 70° C.

Then, PPVE (2.2 g), a solution of APS (22.5 mg) in water (10 ml) and a solution of disuccinic acid peroxide (hereinafter referred to as "DSAP") (375 g) in water (30 ml) were injected together with TFE to increase the internal pressure to 8.0 kg/cm$^2$G.

The reaction proceeded with acceleration while keeping the temperature at 70° C. and the stirring rate at 250 rpm. TFE was injected continuously to maintain the internal pressure at 8.0±0.2 kg/cm$^2$G.

After the consumed amount of TFE reached 680 g, the temperature was decreased at a cooling rate of about 0.4° C./min. and after the consumed amount of TFE reached 790 g, the temperature was kept constant at 50° C.

When the consumed amount of TFE reached 1,620 g, stirring and monomer supply were stopped, and the gas was purged to decrease the internal pressure to atmospheric pressure to terminate the reaction.

The whole reaction time was 29.4 hours. The resulting latex was post-treated in the same manner as in Example 1 to obtain PTFE fine powder.

The appearance of the article extruded at RR of was ranked as "A" and the best among the articles produced in Examples.

EXAMPLE 5

In a temperature regulating one liter glass autoclave equipped with anchor type stirring blades made of stainless steel, deionized water (545 ml), an extra pure grade liquid paraffin (30 g) and ammonium perfluorooctanoate (0.55 g) were charged. At 70° C., the autoclave interior was replaced with nitrogen gas three times and TFE twice to purge oxygen. Then, the TFE gas was injected to pressurize to 7.0 kg/cm$^2$G, and the mixture was stirred at 500 rpm at 70° C.

Then, PPVE (0.8 g) and a solution of APS (8.2 mg) in water (5 ml) were injected together with TFE to increase the internal pressure to 8.0 kg/cm$^2$G. The reaction proceeded with acceleration while keeping the reaction temperature at 70° C. and the stirring rate at 500 rpm. TFE was injected continuously to maintain the internal pressure at 8.0±0.2 kg/cm$^2$G.

After the consumed amount of TFE reached 110 g, the temperature was decreased at a cooling rate of about 1.0° C./min. and after the consumed amount of TFE reached 140 g, the temperature was kept constant at 50° C.

When the consumed amount of TFE reached 264 g, stirring and monomer supply were stopped, and the gas was purged to decrease the internal pressure to atmospheric pressure to terminate the reaction.

The whole reaction time was 8.5 hours, and the resulting latex was post-treated in the same manner as in Example 1 to obtain PTFE fine powder.

EXAMPLE 6

In the same manner as in Example 5 but using C$_3$F$_7$OCF(CF$_3$)CF$_2$OCF=CF$_2$ (hereinafter referred to as "n-IVE") (4.8 g) in place of PPVE and controlling the reaction temperature so that the reaction temperature was kept at 70° C. till 120 g of TFE was consumed, then reduced at a cooling rate of about 1.0° C./min. and maintained at 45° C. after 138 g of TFE was consumed, the polymerization was carried out. The reaction was terminated when 269 g of TFE was consumed.

The whole reaction time was 9.1 hours, and the resulting latex was post-treated in the same manner as in Example 1 to obtain PTFE fine powder.

The content of the modifier monomer in the polymer was measured in substantially the same manner as in Example 1.

COMPARATIVE EXAMPLE 1

The procedures described in Japanese Patent Publication No. 38169/1975 were repeated as follows:

The procedures were the same as in Example 1 but using 13 mg of APS and no hydroquinone and terminating the reaction when 263 g of TFE was consumed.

The whole reaction time was 1.85 hours, and the resulting latex was post-treated in the same manner as in Example 1 to obtain PTFE fine powder.

The green elongation of the extruded article was 34% and its drawing processability was poor.

COMPARATIVE EXAMPLE 2

The procedures described in Japanese Patent Publication No. 39943/1975 were repeated as follows:

In the same autoclave as used in Example 3, deionized water (2,960 ml), solid paraffin wax having a melting point of 56° C. (120 g) and ammonium perfluorooctanoate (3.0 g) were charged. At 70° C., the autoclave interior was replaced with nitrogen gas three times and TFE twice to purge oxygen. Then, the TFE gas was injected to pressurize to 7.0 kg/cm$^2$G, and the mixture was stirred at 250 rpm at 70° C.

Then, a solution of APS (15 mg) in water (20 ml) was injected together with TFE to increase the internal pressure to 8.0 kg/cm$^2$G. The reaction proceeded with slight acceleration while keeping the reaction temperature at 70° C. and the stirring rate at 250 rpm. TFE was injected continuously to maintain the internal pressure at 8.0 kg/cm$^2$G.

When the amount of TFE consumed in the reaction reached 570 g (after 4.8 hours from the addition of APS), a solution of hydroquinone (7.5 g) in water (20 ml) was injected together with TFE.

Although the reaction rate considerably decreased, the reaction was continued. When the consumed amount of TFE reached 1,270 g, stirring and monomer supply were stopped, and the gas was purged to decrease the internal pressure to atmospheric pressure to terminate the reaction. When hydroquinone was added, 45% by weight of the polymer to be finally produced was produced. The whole reaction time was 21.4 hours. The resulting latex was coagulated and dried in the same manner as in Example 3 followed by drying at 200° C. for 16 hours.

The appearance of the article extruded at RR of 710 was ranked as "D". The drawing processability was good.

In the adhesive test, the pieces were peeled off at 4.1 kg/cm while all the test pieces in Examples and other Comparative Examples were broken without peeling off. The sintered article had inferior transparency.

COMPARATIVE EXAMPLE 3

In the same manner as in Example 4 but charging 22.5 g of APS and 750 mg of DSAP and carrying out the reaction at 70° C. over the whole reaction period, the reaction was proceeded and terminated when 1,495 g of TFE was consumed.

The whole reaction time was 15.3 hours, and the resulting latex was post-treated in the same manner as in Example 4 to obtain PTFE fine powder.

The obtained PTFE has large SSG of 2.180.

The extrusion pressure at RR of 710 was 636 kg/cm², and the appearance of the extruded article was ranked as "A". However, the result of the flex life test was unsatisfactory.

COMPARATIVE EXAMPLE 4

Commercially available modified PTFE fine powder (TEFLON (trade mark) 62J, Lot No. 62085) was used. The IR spectrum chart had an absorption peat at 995 cm$^{-1}$, from which the content of the modifier was calculated as in Examples. The properties of this PTFE fine powder were substantially the same as those of PTFE fine powder produced in Comparative Example 1.

What is claimed is:

1. Modified polytetrafluoroethylene fine powder which comprises colloidal particles of a copolymer comprising repeating units of tetrafluoroethylene and 0.02 to 0.3% by weight of repeating units of a fluoroalkyl vinyl ether of the formula:

$$C_4F_7(OCF_2CF_2CF_2)_m[OCF(CF_3)CF_2]_l OCF=CF_2 \quad (II)$$

wherein m and l are each an integer of 0 to 4 provided that at least one of the integers is not zero, wherein said colloidal particles have a number average particle size of 0.05 to 0.6 μm, wherein said copolymer has a specific melt viscosity of from $6 \times 10^{10}$ to $30 \times 10^{10}$ poise at 380° C. and a standard specific gravity of from 2.135 to 2.175 and wherein a paste extruded article of said copolymer has a green elongation of at least 400%.

2. The modified polytetrafluoroethylene fine powder according to claim 1, wherein the content of the fluoroalkyl vinyl ether is from 0.03 to 0.2% by weight.

3. The modified polytetrafluoroethylene fine powder according to claim 1, wherein the specific melt viscosity is from $8.0 \times 10^{10}$ to $25 \times 10^{10}$ poise at 380° C.

4. The modified polytetrafluoroethylene fine powder according to claim 1, wherein the standard specific gravity is from 2.140 to 2.170.

5. The modified polytetrafluoroethylene fine powder according to claim 4, wherein the standard specific gravity is from 2.140 to 2.160.

6. The modified polytetrafluoroethylene fine powder according to claim 1, wherein the fluoroalkyl vinyl ether is a compound of the formula:

$$C_3F_7[OCF(CF_3)CF_2]_l OCF=CF_2$$

wherein l is 1 or 2.

TABLE 2

| Example No. | 1 | 2 | 3 | 4 | 5 | 6 | Com. 1 | Com. 2 | Com. 3 | Com. 4 |
|---|---|---|---|---|---|---|---|---|---|---|
| Polymer concentration (wt. %) | 30.1 | 32.4 | 26.2 | 35.0 | 32.2 | 32.7 | 32.4 | 29.8 | 33.2 | — |
| Number average particle size (μm) | 0.19 | 0.20 | 0.19 | 0.21 | 0.18 | 0.20 | 0.18 | 0.25 | 0.19 | — |
| Modifier | PPVE | PPVE | PPVE | PPVE | PPVE | n-IVE | PPVE | — | PPVE | (PPVE) |
| Content of modifier (wt. %) | 0.061 | 0.086 | 0.03 | 0.092 | 0.18 | 0.070 | 0.082 | 0 | 0.103 | 0.099 |
| SSG | 2.156 | 2.161 | 2.153 | 2.161 | 2.159 | 2.146 | 2.160 | 2.159 | 2.180 | 2.165 |
| Specific melt viscosity ($\times 10^{10}$ poise) | 12 | 8.0 | 9.2 | 13 | 12 | 14 | 2.5 | 35 | 6.0 | 1.0 |
| Extrusion pressure at RR of 100 (kg/cm²) | 123 | 120 | 187 | 97 | 139 | 110 | 122 | 176 | 114 | 101 |
| Extrusion pressure at RR of 710 (kg/cm²) | 772 | 750 | 1,130 | 596 | 753 | 691 | 568 | 568 | 636 | 468 |
| Appearance at RR of 710 | B | B | C | A | B | B | A | D | A | A |
| Green elongation (%) | 1,100 | 650 | 660 | 690 | 610 | 720 | 340 | 430 | 380 | 180 |
| Drawing processability | | | | | | | | | | |
| No. 1 | 96 A | 85 A | 99 A | 92 A | 89 A | 100 A | D | 99 A | D | D |
| No. 2 | A | A | A | A | A | A | D | A | D | D |
| No. 3 | 88 A | D | 97 A | D | 75 C | 92 A | D | 92 A | D | D |
| No. 4 | D | D | D | D | D | D | D | 75 A | D | D |
| Flex life ($\times 10^6$) | >6 | >6 | >6 | 14 | >6 | >6 | >6 | — | 4.1 | >6 |

* * * * *

UNITED STATES PATENT AND TRADEMARK OFFICE
CERTIFICATE OF CORRECTION

PATENT NO. : 5,176,958
DATED : January 5, 1993
INVENTOR(S) : Tetsuo Shimizu, Kazutaka Hosokawa, Masuo Kokumai, Makoto Ono It is certified that error appears in the above-identified patent and that said Letters Patent is hereby corrected as shown below:

At Column 16 of the patent, claim 1, line 5, change

"$C_{43}F_7(OCF_2CF_2CF_2)_m [OCF(CF_3)CF_2]_1 OCF=CF_2$     (II)"

to

--$C_3F_7(OCF_2CF_2CF_2)_m [OCF(CF_3)CF_2]_1 OCF=CF_2$     (II)--

Signed and Sealed this

First Day of March, 1994

Attest:

BRUCE LEHMAN

Attesting Officer

Commissioner of Patents and Trademarks